US006317993B1

(12) United States Patent
Loyd

(10) Patent No.: US 6,317,993 B1
(45) Date of Patent: Nov. 20, 2001

(54) PIPE FLANGE SQUARE AND METHOD

(76) Inventor: Ernie Loyd, P.O. Box 11836, New Iberia, LA (US) 70562

( * ) Notice: Subject to any disclaimer, the term of this patent is extended or adjusted under 35 U.S.C. 154(b) by 21 days.

(21) Appl. No.: 09/588,516

(22) Filed: Jun. 6, 2000

(51) Int. Cl.[7] .............................. B43L 7/027; B43L 7/033
(52) U.S. Cl. ........................ 033/429; 033/529; 033/412; 033/474
(58) Field of Search ...................... 33/429, 412, 474, 33/476, 529, 534, 535, 477, 478, 479, 480, 481, 482, 483, 494

(56) References Cited

U.S. PATENT DOCUMENTS

| 2,461,783 | * | 2/1949 | Stark | 33/529 |
| 2,749,622 | * | 6/1956 | Rasco | 33/529 |
| 4,138,819 | * | 2/1979 | Sosin | 33/476 |
| 4,375,724 | * | 3/1983 | Brock | 33/529 |
| 4,380,872 | | 4/1983 | Moran | 33/529 |
| 4,497,119 | * | 2/1985 | Dearman | 33/529 |
| 4,662,055 | | 5/1987 | VanMeter | 33/613 |
| 4,914,825 | | 4/1990 | Howard | 33/529 |
| 5,231,766 | | 8/1993 | Pavlak | 33/529 |

* cited by examiner

Primary Examiner—Christopher W. Fulton
(74) Attorney, Agent, or Firm—Robert N. Montgomery

(57) ABSTRACT

A tool for determining the perpendicular of the face of a pipe flange relative to the outside diameter of the pipe to which the flange is being attached. The tool being a 90 degree framing square with a lateral or oblique leg portion. The lateral or oblique leg allows the square to be placed on edge with a first leg of the square parallel and in contact with the face of a pipe flange and a second leg at 90 degrees to the first leg extending beyond the pipe flange parallel to and in contact with the outer diameter of the pipe to be joined to the flange. Indicia is provided inscribed on the face of the squaring tool adjacent the contact edges to provide quick reference to the flange size and for use in various other construction layout measurements.

5 Claims, 1 Drawing Sheet

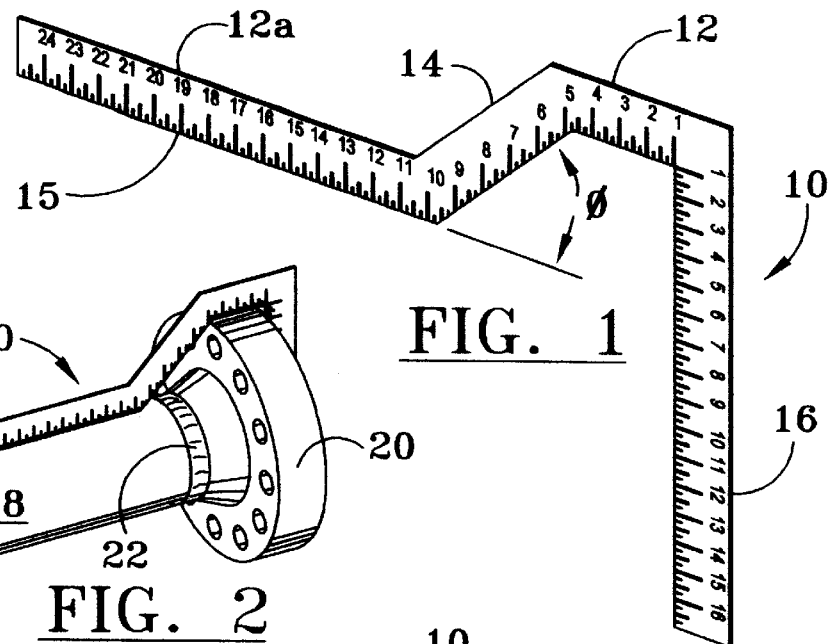
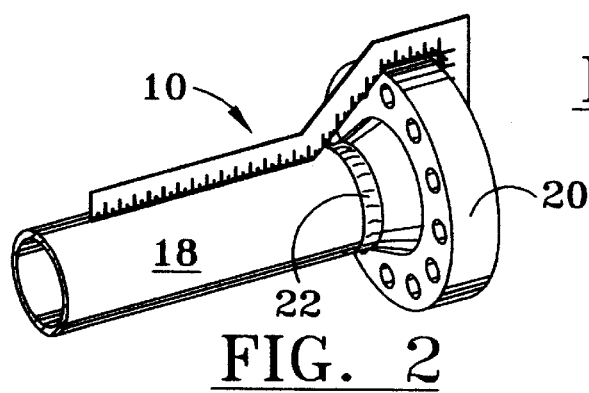
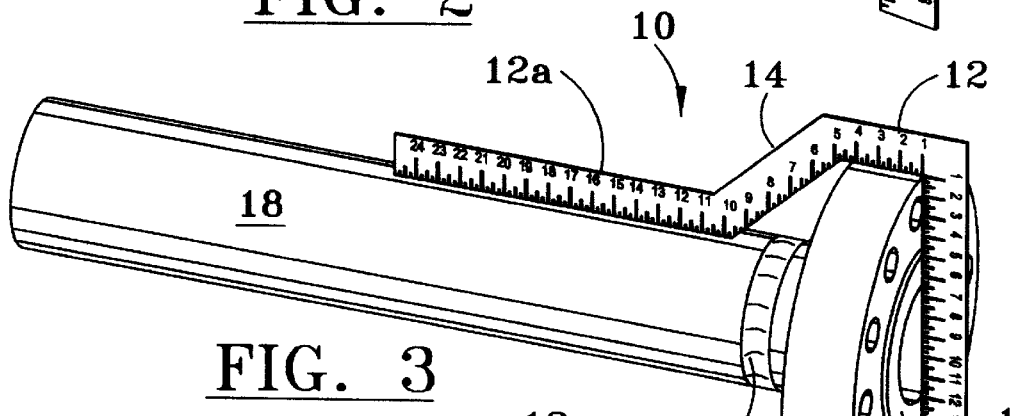
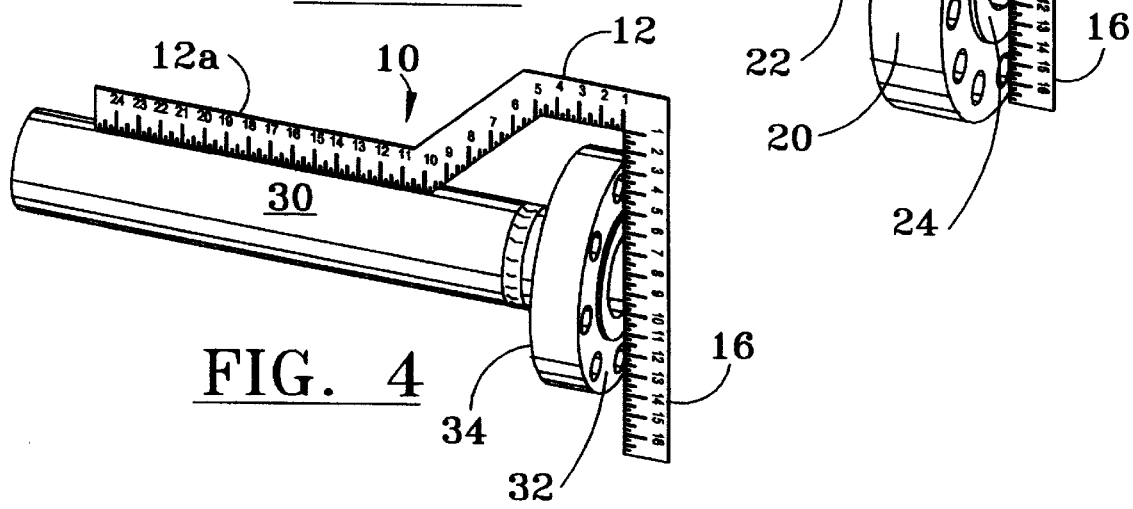
FIG. 1
FIG. 2
FIG. 3
FIG. 4

PIPE FLANGE SQUARE AND METHOD

BACKGROUND OF THE INVENTION

1. Field of the Invention

This invention relates generally to the field of pipe fitting and more particularly to an apparatus and method for the squaring of a pipe flange relative to an adjoining pipe in preparation for welding.

2. General Background

When preparing to weld a pipe flange to the end of a pipe, it is necessary to align the diameters of the neck portion of the flange and the pipe to which the flange is to be welded. In most cases the ends of the flange neck portion and the pipe have been prepared with an acute bevel. The two ends are brought into close proximity and held in place by a series of clamps and spacers located around the periphery of the pipe outer diameter in such a manner as to leave the joint unobstructed for welding. Shims and the like are provided in association with the clamps for adjustably aligning the flange neck portion with the pipe diameter. To insure that the face of the flange is in fact truly perpendicular to the pipe diameter, a large framing square is used as reference. By placing one leg of the square along the face of the flange and using a tape measure to determine the distance from the opposite leg of the square suspended above the pipe's outer diameter and repeating this procedure at various points around the diameter of the pipe, a mean average can be ascertained. The clamp spacers may then be adjusted to true the flange face with the pipe and the process repeated until a reasonably true perpendicular is achieved.

Methods have been devised for squaring the ends of pipe, such as is disclosed by Paviak in U.S. Pat. No. 5,231,766. Squaring tools for use by pipe fitters have been developed for determining the angle for joining and leveling pipe, etc., as disclosed by Howard in U.S. Pat. No. 4,914,825. Tools have also been developed for determining the parallel spaced apart relationship of pipe joints and the like with a caliper-like instrument, such as is disclosed by Moran in U.S. Pat. No. 4,380,872. A number of apparatus have also been devised for aligning the flanges of two adjoining pipes, such as is disclosed by VanMeter in U.S. Pat. No. 4,662,055. However, the art does not seem to provide an easy and efficient tool for determining perpendicularly of the face of a pipe flange relative to the outer diameter of the pipe being attached.

SUMMARY OF THE INVENTION

A tool is disclosed herein for determining the perpendicular of the face of a pipe flange relative to the outside diameter of the pipe to which the flange is being attached. The squaring tool being basically a 90 degree framing square with an oblique leg portion, the flange framing square formed in the customary manner from a relatively thin sheet material having some rigidity with leg widths of 11/2 to 2 inches. The lateral or oblique leg allows the square to be place on edge with a first leg of the square parallel and in contact with the face of a pipe flange and a second leg at 90 degrees to the first leg extending beyond the pipe flange parallel to and in contact with the outer diameter of the pipe to be joined to the flange. Indicia may be provided inscribed along the face of the square's contact edges to provide quick reference to the flange size and for use in various other construction framing layout measurements.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein FIG. 1 is an isometric view of the framing square.

FIG. 2 is a rear isometric view of the square in use with a pipe and flange assembly.

FIG. 3 is an enlarged front isometric view of the square in use with a pipe and flange assembly.

FIG. 4 is a front isometric view of the Square in use with a smaller size pipe and flange assembly.

DETAILED DESCRIPTION OF THE PREFERRED EMBODIMENT

As seen in FIG. 1, the flat, unitary, pipe flange framing square 10 is basically a carpenter's framing square, except it includes a lateral or oblique leg portion 14. Indicia 15 is provided with numbering in inches or metric equivalents to any length, although the preferred size is usually 1–16 inches on the vertical leg 16 and 1–24 inches on the horizontal leg 12a, the numbering included along the lateral or oblique leg portion. This size square is not much different than that of a conventional square and can be easily carried in a tool box and accommodated by the most commonly used pipe and flanges. Pipe flanges which fall within this range are usually not greater than four and one-half inches in thickness. Therefore, the horizontal leg portion 12 of the square 10 and its numbering may translate into the lateral or oblique leg portion at or beyond this point as seen in FIGS. 2 and 3. The lateral or oblique leg 14 is established as angle φ at 45–60 degrees to insure that the lateral or oblique leg 14 transitions from the rear of the outer diameter of the pipe flange 20 to the outer diameter of the pipe 18 without contacting the weld line 22, as seen in FIG. 3. Larger pipe framing squares could be provided to accommodate larger flanges and pipe if desired.

The assembly of the flange and pipe begins by customarily placing a series of clamps attached to the flange 20 and the pipe 18 which hold the flange's beveled welding neck and squared end in close proximity with a pipe having a squared end prepared for welding. Alignment of the two components is achieved by placing shims between the clamps, the pipe, and flange welding neck. This procedure is widely practiced in the pipe welding art and need not be shown here as relative to this invention. However, the square 10 being a relatively thin, flat blade is capable of avoiding the clamps when contacting the pipe 18 and flange 20.

The squaring of the flange 20 relative to the pipe 18, as seen in FIG. 3, starts by placing the vertical leg 16 on edge in contact with at least two diametrically opposite points on the flange face or the raised face portion 24 of the flange 20. The horizontal leg portion 12 of the square 10 may rest on the outer diameter of the flange of larger pipe flanges which are at the maximum range of the square. With the lateral or oblique leg portion 14 extending rearward of the flange and downward parallel to the pipe, the horizontal leg 12 transitions to the horizontal leg portion 12a which is also parallel to and in contact with the pipe 18. The pipe flange 20 is then adjusted by adjusting the clamps or adding or removing shims under the clamps to allow the horizontal leg 12a to be aligned and in full linear contact with the outer diameter of the pipe 18. Moving the square 10 rotationally in approximately 90 degree increments around the face of the flange, between the clamps, and repeating the squaring process as necessary by shimming and adjusting the various clamps, insures a true perpendicular flange face 24 relative to the pipe 18.

Smaller pipe and flanges as seen in FIG. 4 are squared in a similar manner as the larger sizes or by simply resting the horizontal leg 12a on edge and in linear contact with the pipe 30 and determining the squareness of the flange face 32 relative to the vertical leg 16. In this case it is not necessary for the horizontal leg portion 12 to contact the outer or major diameter of flange 34. Squareness is achieved by adjusting the above mentioned clamps and or shims until the flange face 32 is in full contact with or at least in contact with two diametrically opposite points along the vertical leg 16 of the square 10. The process is then repeated as necessary until perpendicular is achieved between the pipe outer diameter and the flange face 32.

Once the pipe flange is tacked to the pipe end, the clamps may be removed and full welding of the joint may begin. However, additional squaring may be required through out the welding process due to drawing of the weld 22, in which case squaring is achieved by alternating weld patterns.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A pipe flange square comprising a flat, framing square having a elongated vertical and horizontal leg the horizontal leg positioned 90 degrees relative to the vertical leg, the horizontal leg having an oblique portion therein for offsetting a first portion of the horizontal leg from a second portion of the horizontal leg.

2. The pipe flange square according to claim 1 wherein said framing square further comprises a horizontal leg which is longer than the vertical leg.

3. The pipe flange square according to claim 1 wherein said framing square further comprises incremental indicia along at least one face of the vertical and horizontal legs, including the oblique portion of said horizontal leg.

4. A method for determining the perpendicular of the face of a pipe flange relative to the outside diameter of a pipe being welded thereto comprising the steps of a) clamping a pipe flange having a welding neck in close proximity to a squared pipe end prepared for welding;

b) providing a flat framing square having a vertical and horizontal leg, the horizontal leg being positioned 90 degrees relative to the vertical leg, the horizontal leg having first and second portions separated by an oblique portion, said second portion being offset from said first portion;

c) determining the perpendicular of the flange face relative to the outside diameter of the adjoining pipe by placing the framing square on edge in a manner whereby the vertical leg is parallel to and in contact with at least two opposing diametrical points located on said flange face;

d) adjusting said flange relative to the adjoining pipe until linear contact is achieved between the pipe and the second offset portion of the framing square; and e) moving the framing square circumfrentially around the flange face and repeating step d) until the flange face is perpendicular relative to the outer diameter of the pipe.

5. A method for determining the perpendicular of the face of a pipe flange relative to the outside diameter of a pipe being welded thereto comprising the steps of:

a) clamping a pipe flange having a welding neck in close proximity to a squared pipe end prepared for welding;

b) providing a flat, framing square having a vertical and horizontal leg, the horizontal leg being positioned 90 degrees relative to the vertical leg, the horizontal leg having first and second portions separated by an oblique portion, said second portion being offset from said first portion;

c) determining the perpendicular of the flange face relative to the outside diameter of the adjoining pipe by placing the framing square on edge in a manner whereby the horizontal leg is parallel to and in linear contact with the outer diameter of the pipe;

d) adjusting said flange relative to the adjoining pipe until at least two opposing diametrical points located on said flange face are in contact with the vertical leg of the framing square; and e) moving the framing square rotationally around the flange face and repeating step d) until the flange face is perpendicular relative to the outer diameter of the pipe.

* * * * *